UNITED STATES PATENT OFFICE.

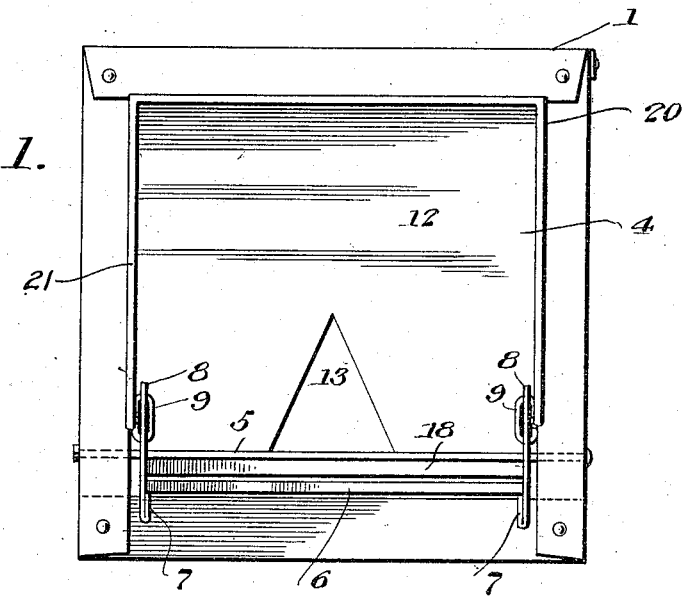
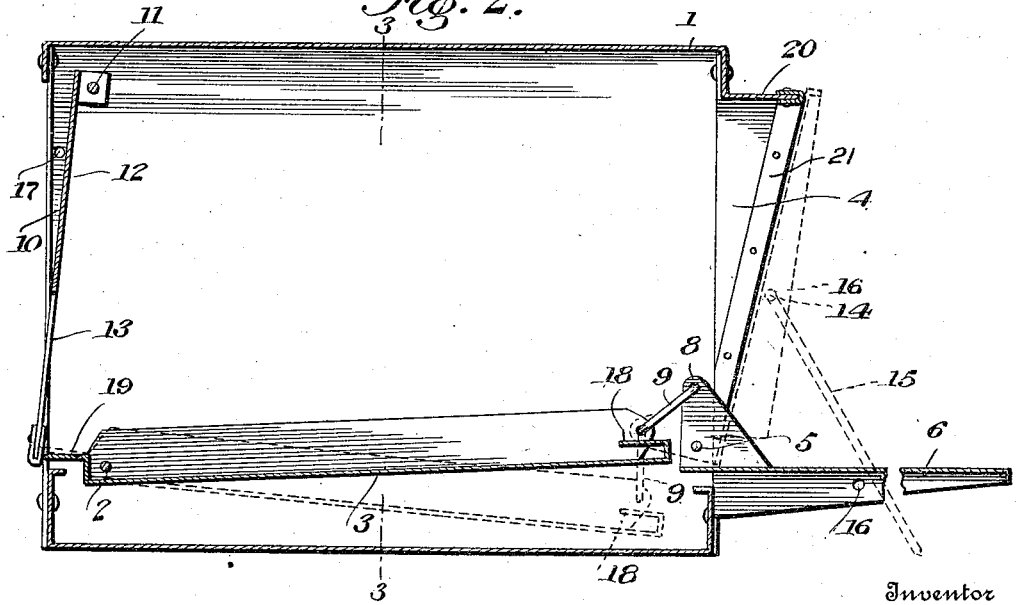

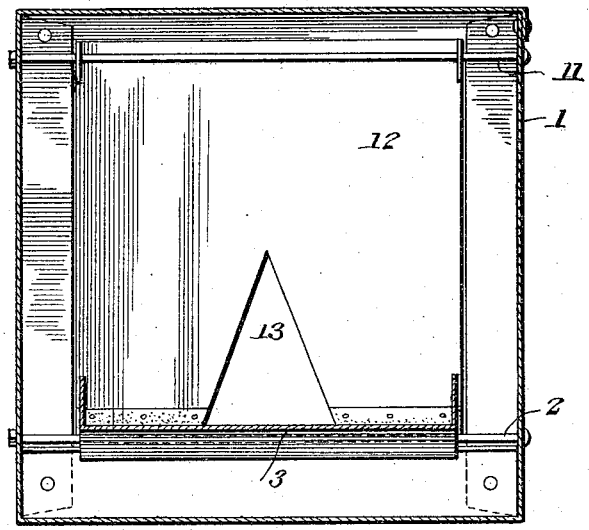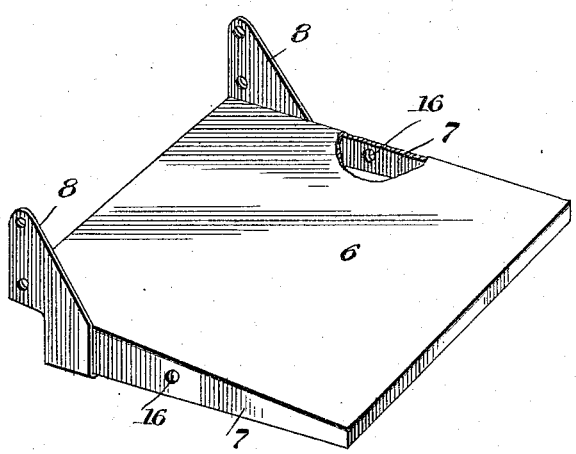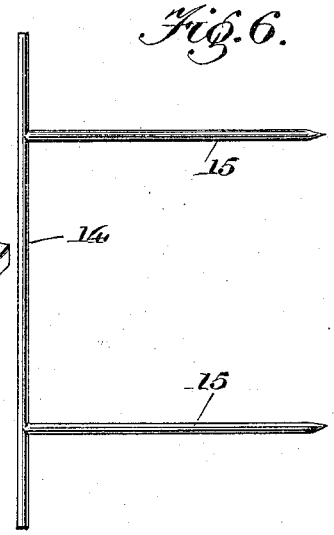

JOHN S. HARKINS, OF GREENSBURG, PENNSYLVANIA.

TRAP-NEST.

1,184,235.  Specification of Letters Patent. Patented May 23, 1916.

Application filed September 8, 1913. Serial No. 788,705.

*To all whom it may concern:*

Be it known that I, JOHN S. HARKINS, a citizen of the United States of America, residing at Greensburg, Pennsylvania, have invented certain new and useful Improvements in Trap-Nests, of which the following is a specification.

This invention relates to certain novel and useful improvements in trap nests.

In carrying out the present invention, it is my purpose to provide a trap nest which will be entirely automatic in operation and wherein the doors controlling the entrance and exit openings will open outwardly of the body or casing of the nest so that the entire space within the casing or body will be available for nest room.

It is also my purpose to provide a trap nest which will embody, among other features, a body or casing having an entrance opening therein adapted to be closed by means of a door pivoted horizontally adjacent to the lower end of the opening and normally maintaining a horizontal open position to form a rest or platform whereby the hen may enter the body and capable of movement to vertical position to close the entrance opening succeeding the hen entering the nest, such body being also formed with an exit opening normally closed by means of a gravity controlled door, means being provided whereby the door controlling the entrance opening may be held in closed position after the hen has left the nest, or the exit door held against opening movement so that the hen, after entering the nest, will be held therein.

Furthermore, I aim to provide a trap nest which will embrace the desired features of simplicity, efficiency and durability, one which will be entirely automatic in operation and one which may be manufactured and marketed at a minimum expense.

With the above and other objects in view, the invention consists in the construction, combination and arrangement of parts hereinafter set forth in and falling within the scope of the claim.

In the accompanying drawings: Figure 1 is a view in front elevation of a trap nest constructed in accordance with my present invention. Fig. 2 is a vertical longitudinal sectional view therethrough. Fig. 3 is a vertical transverse sectional view of the same. Fig. 4 is a perspective view of the door controlling the entrance opening; a portion being broken away. Fig. 5 is a view in edge elevation of one of the links connecting the door with the tilting platform of the nest. Fig. 6 shows the device for maintaining the doors of the nest closed.

Referring now to the accompanying drawings in detail, the numeral 1 designates the body of the trap nest, such body being preferably composed of sheet metal and embodying top, bottom, side and end walls appropriately connected together and forming a body or casing of substantially rectangular contour. Passed transversely through the casing 1 adjacent to the rear end and bottom walls thereof is a shaft 2 having the opposite ends thereof secured to the opposite side walls of the casing. Arranged within the casing 1 adjacent to the bottom wall thereof is a horizontal platform 3 having the rear end thereof pivoted upon the shaft 2 so that the platform may swing or rock about a horizontal axis. This platform is preferably constructed of sheet metal stamped or cut to any desired configuration. Formed in the front wall of the casing 1 is an entrance opening 4 and secured to the opposite side walls of the casing adjacent to the lower end of the entrance opening is a horizontal pivot rod 5.

The numeral 6 designates a door controlling the opening 4 and composed of sheet metal having the opposite edges thereof downturned or flanged outwardly as at 7 and having pivot lugs or ears 8—8 punched at the opposite extremities of one end edge thereof and extending outwardly therefrom in a direction opposite from the flanges 7—7. These pivot ears 8—8 receive the rod 5 so that the door 6 may be swung to open and closed positions, while the inner ends of the flanges 7—7 constitute shoulders designed to abut the front wall of the casing below the opening 4 in the movement of the door to open position so as to maintain the door substantially horizontal and limit the opening movement thereof. In the horizontal open position of the door 6, the inner ends of the ears 8—8 are at the highest point, such ends of the ears swinging through an arc, and these ends are connected through the medium of links 9—9 with the forward edge of the platform 3.

The rear end of the body 1 is formed with an exit opening 10 while arranged transversely of the body is a pivot rod 11 disposed adjacent to the upper end of the exit opening 10 and suspended from the pivot rod 11 is a door 12 normally closing the exit opening and maintaining such closed position under the action of gravity.

In practice, when the nest is idle and no weight upon the platform 3 the door 6 is in open horizontal position as illustrated by the full lines in Fig. 2. The hen, wishing to enter the nest, first steps upon the rest or platform formed by the door 6 and then passes through the entrance opening 4 onto the platform 3. The weight of the hen upon the platform causes the latter to descend or swing downwardly and in the downward movement of the platform the door 6 is swung upwardly to a substantially vertical position to close the door opening 4, incident to the link connections between the forward edge of the platform and the inner ends of the pivot ears of the door. The nest is thus closed to the entrance of another hen and when the hen within the nest desires to leave the same, such hen passes to the rear end of the nest, incident to the light passing through an opening or window 13 in the exit door 12, and contacts with the rear door thereby swinging the latter about the pivot rod 11 to open position. After the door 12 is relieved of the influence of the hen, such door gravitates to closed position. Upon the hen leaving the nest by way of the exit opening in the body, the door 6 swings downwardly to its original position, owing to the weight of the hen being removed from the platform.

In some instances it may be found advisable to maintain the door 6 closed after the hen has left the nest, or prevent the exit door from swinging open while the hen is in the nest and for these purposes I employ a holding device comprising, in the present instance, a rod 14 equipped, adjacent to its opposite ends, with legs 15, 15 arranged in parallelism and at right angles to the rod. When it is desired to hold the door 6 closed, the opposite extremities of the rod 14 are passed through alining openings 16 formed in the flanges 7, while the free extremities of the legs 15 rest upon the ground or other support and so prevent the return of the door to open position subsequent to the hen leaving the nest. To hold the exit door 12 against opening movement under the weight of the hen, the opposite ends of the rod 14 are passed through alining apertures 17 formed in the opposite side walls of the casing or body 1 at a point below the pivot rod 11.

In the present instance, the forward edge of the platform 3 is bent upon itself to form a retaining flange 18 designed to prevent displacement of the lining of the trap nest, while the rear edge of the platform, beyond the pivot shaft 2, is formed with an outwardly projecting shelf 19 designed to abut the rear wall of the body of the nest so that the hen may conveniently leave the same. In this embodiment of my invention, a hood 20 projects outwardly of the front wall of the casing or body 1 and surrounds the entrance opening therein and has the outer edges of the opposite side walls thereof inclined inwardly and preferably lined with felt 21, as clearly illustrated in Fig. 2 of the drawings, so that the door 6 will effectively close the entrance opening.

From the foregoing description taken in connection with the accompanying drawing, the construction, mode of operation and manner of employing my invention will be readily apparent. It will be seen that I have provided a trap nest which is entirely automatic in operation, one which the hen, under ordinary conditions, may enter and leave the nest of her own volition and one wherein the controlling doors open outwardly of the body or casing of the nest thereby enabling the entire area of the interior of the body to be used for nest purposes.

While I have herein shown and described one preferred form of my invention by way of illustration, I wish it to be understood that I do not limit or confine myself to the precise details of construction herein described and delineated, as modification and variation may be made within the scope of the claim without departing from the spirit of the invention.

I claim:

A trap nest comprising a body having entrance and exit openings, a horizontal platform pivoted within said body and capable of swinging movement about a horizontal axis, a door for said entrance opening pivoted adjacent to its lower end for swinging movement to open and closed positions, flanges formed on the side edges of said door and projecting outwardly therefrom at right angles thereto and having the inner ends thereof in engagement with the front wall of the body below the inlet opening to limit the swinging movement of the door to open position and maintain the same in a horizontal plane when open, a connection between said platform and said door whereby the downward movement of said platform under the weight of a hen will close the door, and a door closing said exit opening.

In testimony whereof I affix my signature in the presence of two witnesses.

JOHN S. HARKINS.

Witnesses:
WM. G. SLOAN,
R. F. THOMAS.

Copies of this patent may be obtained for five cents each, by addressing the "Commissioner of Patents, Washington, D. C."